United States Patent Office 3,181,834
Patented May 4, 1965

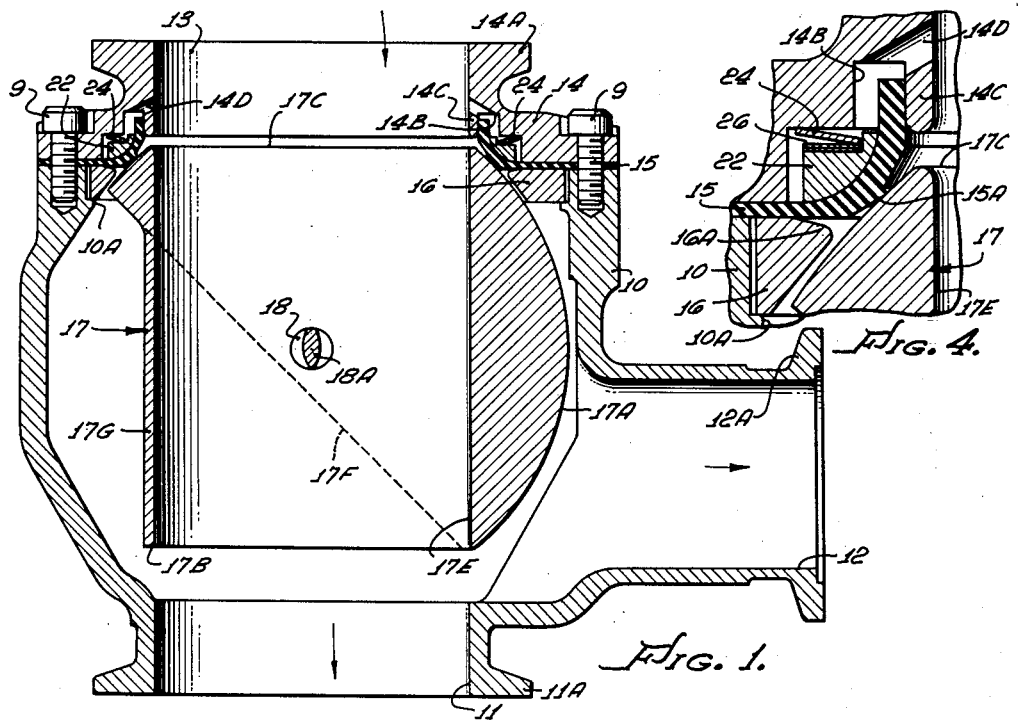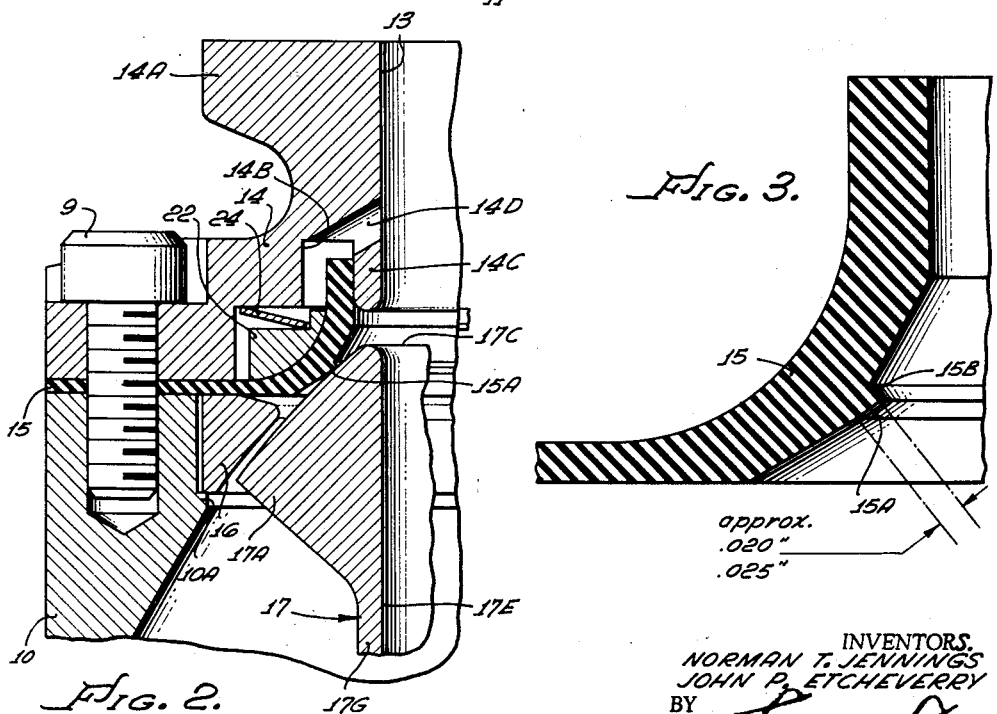

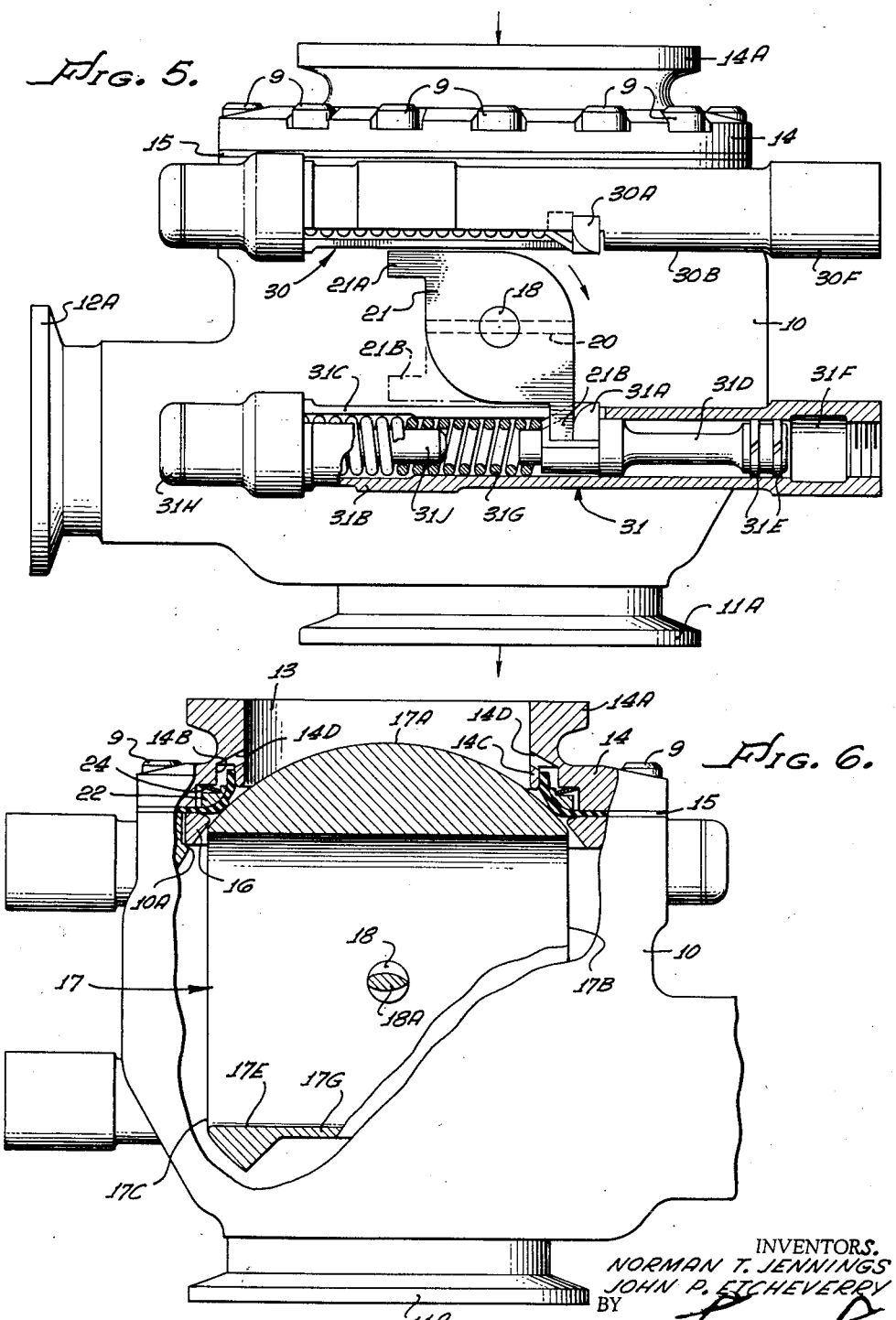

3,181,834
BIASED SEAL STRUCTURE FOR BALL VALVES
Norman T. Jennings, North Hollywood, and John P. Etcheverry, Burbank, Calif., assignors to International Telephone and Telegraph Corporation, Baltimore, Md., a corporation of Maryland
Filed June 9, 1961, Ser. No. 116,113
10 Claims. (Cl. 251—172)

The present invention relates to means and techniques useful in valve structures and particularly to a sealing structure in a valving arrangement.

As disclosed herein, the present invention involves a valve having a valve element which is generally ball-shaped and which cooperates with a gasket to provide a good sealing structure in the closed position of the valve. The gasket, which is a generally annular member, is provided with a land engageable with the arcuate shape of the ball-shaped valve element and which is biased in engagement therewith by not only an annular-type spring but also by fluid pressure existing at the upstream end of the valve in its closed position.

The construction is particularly useful in providing a seal against fluids, gases or gas-pressurized fluid and is admirably suited where the gas is pressurized helium with the requirement that a substantially leakage-proof condition exists in the flow-closed position of the valve.

It is therefore a general object of the present invention to provide an improved valve of the character indicated above.

A specific object of the present invention is to provide an improved sealing structure which is particularly useful in a ball or ball-type valve to provide a seal against fluids, gases, gas-pressurized fluids and particularly helium.

Another specific object of the present invention is to provide an improved seal construction that provides minimum damage from contaminant particles, thereby making the same particularly useful in sealing helium.

Another specific object of the present invention is to provide an improved seal construction which is relatively simple, easy to fabricate and assemble without detriment to sealing effectiveness.

Another object of the present invention is to provide an improved sealing arrangement in which a flexible element has the combined functions of a seal and a diaphragm in effecting a good seal.

Another object of the present invention is to provide an improved sealing arrangement in which a flexible element has a single narrow land to lessen damage by contaminant particles.

Another object of the present invention is to provide a sealing arrangement of this character involving a flexible sealing element which is self-centering, thereby eliminating the need for precise lateral positioning.

Another object of the present invention is to provide a sealing arrangement of this character in which a flexible element may be used in regular and irregular shaped body openings and in which the same acts as a diaphragm with the diaphragm deflection being controlled by an adaptor plate suitably shaped both for deflection and support, the shape control in this particular instance being achieved by a regular circular chamfer on the adaptor plate near a land on the flexible sealing element.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a longitudinal sectional view through a valve embodying features of the present invention, the valve being shown in its open position.

FIGURE 2 illustrates in enlarged form a portion of the valve structure shown in FIGURE 1.

FIGURE 3 shows in enlarged form a portion of the sealing gasket member illustrated in FIGURES 1 and 2.

FIGURE 4 is a sectional view similar to that shown in FIGURE 2 but illustrates a modified arrangement involving use of shims.

FIGURE 5 is a side view of the valve construction shown in FIGURE 1 taken from that side of the valve upon which the valve-actuating mechanism is mounted, some of such valve-actuating mechanism being illustrated in section.

FIGURE 6 is a view like FIGURE 1 but illustrates the movable valve element in its closed position.

Referring to the drawings, the valve includes a valve casing or body 10 having a pair of annular outlet openings 11 and 12, such outlet openings 11 and 12 terminating in annular flanged portions 11A and 12A respectively that serve as conventional fittings for pipes or tubes connectable thereto. The inlet to the valve is illustrated at 13 and the same is defined generally by a special collar 14 which is bolted by means of a series of bolts 9 around its circumference to the valve casing 10 with the special annular sealing gasket 15 sandwiched therebetween, such collar 14 also terminating in an annular flange portion 14A forming a fitting for connection to a pressure source such as, for example, a source of helium or other gas, fluid or gas-pressurized fluid.

It will also be seen in FIGURE 1 that an outer peripheral portion of the gasket member or seal 15 is sandwiched between the collar 14 and a ring-shaped member 16 which is seated on the annular internal shouldered portion 10A of casing 10 to thereby provide a larger extended contact area for the seal 15 and the valve casing 10 proper, considering that in such case this ring 16 in effect forms an inner extension of the valve casing 10. This particular ring 16 is provided since in assembly and disassembly it may be removed to allow the removable ball-shaped valve element 17 to be inserted into and removed from the upper portion of the valve casing 10 in FIGURE 1.

The movable valve element 17 is rotatable through a distance of approximately 90 degrees by mechanism described later from its open position illustrated in FIGURE 1 to its closed position illustrated in FIGURE 6. It will be seen that this valve element 17 is generally in the nature of a tube having, however, an outer ball-shaped portion 17A. Indeed, the valve element 17 may be formed by first forming a ball; however, providing such ball with truncated portions 17B, 17C and forming a bore hole 17E through the same. Also, a portion of the outer surface of the ball may be removed along a line indicated by the dotted line 17F in FIGURE 1 such that a portion of the movable valve element 17 then is in the form of a thin wall tube portion 17G.

A shaft 18 extends centrally through the valve element 17 with the axis of the shaft extending generally perpendicular to the axis of the ball bore 17E, i.e. the center of shaft 18 corresponds to the center of the radius of the outer ball-shaped portion of the valve element 17. Opposite ends of the shaft 18 extend sealingly through opposite side walls of casing 10 and one end of the shaft 18 has secured thereon as, for example, by means of pin 20 (FIGURE 5), an actuating member 21 in the form of a bell crank. The central portion of the shaft 18 may have an oval shape, as indicated at 18A in FIGURE 1, for streamlining purposes.

The gasket member 15, as described above, has its outer peripheral edge clamped to the valve casing 10.

The gasket 15, as shown in FIGURE 1, has its inner end curved upwardly with the innermost end thereof extending upwardly into the annular grooved portion 14B of collar 14 and with a portion of the same contacting the wall portion 14C that defines a portion of such groove 14B. An intermediate portion of the gasket member 15 is pressed downwardly on the ball-shaped portion of the movable valve element 17. For this purpose there is provided an annular gasket contact ring 22 which has an inner arcuate and annular face contacting the mating portion of the gasket member 15, such ring 22 being spring-biased into engagement with the adjacent portion of gasket 15 by an annular Belleville spring 24 which has one of its edges bearing against an outer flat surface portion of ring 22 and its outer edge bearing against an annular flat surface of collar member 14.

The compressive forces in the spring 24 thus serve to press the annular land portion 15A of gasket 15 into engagement with the ball portion 17A of the movable valve element 17. As illustrated in FIGURE 3, this land 15A defines a relatively small contact area having a dimension of approximately .020 inch to .025 inch, but this dimension is subject to the particular gasket material used considering possible cold flow of the selected material. The construction allows adjustment of the compressive forces exerted on the land 15A as illustrated in the modification shown in FIGURE 4 wherein one or more annular shims 26 may be first placed between the spring 24 and the adjacent flat surface of ring-shaped member 22. Thus, the compressive forces may be increased by increasing the thickness of the shims 26.

It will also be seen in FIGURE 1 that the annular groove 14B is in communication with a series of angularly extending bores 14D in collar 14 so that pressure existing in the collar 14 is allowed to be transmitted to the outer surface of the gasket member 15 such that such pressure may also be used to aid in effecting a seal between the diaphragm and the ball-shaped portion 17A, i.e. an intermediate annular portion of the gasket 15 thus serves as a diaphragm for this purpose in which the action of spring 24 is supplemented by the pressure introduced through the series of ports 14D.

Various means may be used to move the valve element 17 from and between its two extreme positions illustrated in FIGURES 1 and 6. As illustrated in FIGURE 5, this particular means illustrated involves a crank member 21 mounted on one end of shaft 18, such crank member having a pair of extensions 21A and 21B engageable respectively with extensions 30A and 31A of actuating mechanisms 30 and 31 respectively. These two mechanisms 30 and 31 are identical in construction with the only exception that one is a so called right handed one and the other is left handed and thus a detailed description of the mechanism 31 serves also as a description of the like mechanism 30.

The mechanism 31 involves a cylinder 31B which is formed integrally with casing 10, such cylinder 31B being slotted at 31C to provide a guide slot for an extension of piston 31D. Piston 31D is slidably mounted for guided movement in such cylinder 31B and the same carries a pair of seal rings 31E. Pressure is applied to the cylinder chamber 31F to move the piston 31D, its extension 31A and the abutting crank arm extension 21B to the left in FIGURE 5. Upon release of the pressure, the piston 31D is returned to its position illustrated in FIGURE 5 by the coil compression spring 31G having one of its ends bearing against an end of the piston member 31D and the other one of its ends bearing against a cap member 31H screw-threadedly secured in the lefthand end of cylinder 31B. Such cap 31H has extending therefrom the rod 31J which projects into the spring 31G to serve generally as a guide for the movement of the spring and prevent its buckling.

It is noted that there is a one-way connection between the extensions 21B and 31A on the one hand and 21A and 30A on the other hand. The condition illustrated in FIGURE 5 corresponds to the closed position of the valve illustrated in FIGURE 6.

To open the valve, pressure is applied to the cylinder 31F to drive the piston 31D to the left, in which case the shaft 18 is rotated in a clockwise direction. In the extreme position the valve is in its open position shown in FIGURE 1 and in such condition the projection 21A is now in engagement with the projection 30A, the same serving as a stop member. When pressure is released from cylinder 31F, the valve 17 remains in its then open position but the actuating extension 31A is returned to its position shown in FIGURE 5. Thereafter, to return the valve 17 to its closed position, pressure is applied to the cylinder 30F, in which case the piston extension 30A moves the crank arm extension 21A in a counterclockwise direction wherein it finally assumes the closed position shown in FIGURE 6, at which time the other crank extension 21B is in engagement with the piston extension 31A that serves as a stop member. It will be observed from the above description that pressure is not required to be applied to either one of the cylinders 30F or 31F to maintain the valve 17 in any one of its adjusted positions.

As alluded to above, this particular mechanism is only one of many which may be used to move the valve element 17 from and between its extreme positions shown in FIGURES 1 and 6 and also to any position intermediate therebetween.

From the foregoing description it will be seen that the objectives of the invention are obtained, i.e. there is provided an upstream seal for a ball or ball-type valve for sealing against fluids, gases or gas-pressurized fluid; there is provided a seal configuration that minimizes damage from contaminant particles and thus is particularly useful in sealing against gases such as helium; and further, there is provided a seal having relatively few parts which may be easily and quickly assembled and disassembled without detriment to sealing effectiveness.

It will also be observed that in the non-pressurized, i.e. pressure balanced, condition corresponding to the flow-open position of the valve shown in FIGURE 1, the sealing land is statically loaded against the ball-shaped valve element 17 by the Belleville-type spring 24 which exerts its force through the back-up ring 22. One purpose of this ring 22 is to provide a metal contact area for the spring and to direct the load in a direction normal to the seal contact land 15A. Between the gasket clamping area and the seal-ball contact, the seal material performs as a diaphragm. Because of this diaphragm action slight differences dimensionally are compensated for by the deflection of the diaphragm. As mentioned previously, shims 26 as illustrated in FIGURE 4 may be used behind the Belleville spring 24 to assure adequate loading. As illustrated in FIGURE 1, in this statically loaded condition contact between the ball and seal is maintained to exclude contaminant particles. Further, it is noted that the seal has a relief portion 15B (FIGURE 3) on the upstream side of the seal land 15A. This relief 15B permits particles that could damage the seal to remain in a free state until dispersed by actuation of the valve.

In the closed position of the valve illustrated in FIGURE 6, sealing effect is increased since pressure in the inlet opening 13 is allowed to exert its pressure onto the diaphragm portion of the seal 15 through the series of ports 14D. Thus, in the flow-closed position of the valve as illustrated in FIGURE 6, the diaphragm portion of the seal "sees" the pressure in the line connected to opening 13 and the information is transmitted to the seal land through ports 14D. Deflection of the diaphragm portion of the seal 15 is controlled by the adaptor plate 16 directly beneath the seal. Irregular body shapes can be accommodated due to deflection being allowed over a regular shaped chamfer nearest the seal land.

In some cases the opening 12 designated heretofore as an outlet port may be used as a filling port depending upon customer requirements and uses.

For a good effective seal the type of machine finish is considered of importance. The seal lead may be single point tooled or lapped and the cooperating ball may be provided with a high degree of lap.

Pressure may be applied to the cylinders 31F and 30F for actuation of the valve by various means. One of such means involves the use of pyrotechnic squib or squibs and in such case energy in excess of the valve's requirements is imparted to the actuating piston 31D and the piston in cylinder 30B. This excess energy may be dissipated by use of auxiliary energy absorbing or buffer mechanism which may involve replaceable energy absorbing closed cellular material or a structure involving energy absorbing springs and/or elastic material. Also, if desired, a conventional detent mechanism cooperating with crank 21 may be provided to more positively maintain the ball in its extreme positions shown in FIGURES 1 and 6.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a valve housing, a collar mounted on said housing, a generally spherically shaped valve element movably mounted in said housing, an annular gasket element having an annular land contacting said ball-shaped valve element, a first contact ring, a portion of said gasket being sandwiched between, on the one hand, said collar and, on the other hand, between said valve casing and said contact ring, said contact ring engaging said gasket on the same side of said gasket as is said land, a second contact ring contacting said gasket on the opposite side thereof than is said land, spring means acting between said collar and said second ring and pressing said land into engagement with said ball-shaped valve element, said collar having an annular groove, a portion of said gasket extending into said annular groove, said collar having a series of ports communicating the interior of said collar with said groove therein so that pressure inside said collar is transmitted to said opposite side of said gasket.

2. An arrangement as set forth in claim 1 in which said first ring is secured on a shouldered portion of said casing and is contoured to accommodate movement of said gasket.

3. A sealing structure comprising a ball-shaped element having an apertured portion therethrough, a housing, means mounting said ball-shaped element in said housing, an annular gasket element having an annular land contacting said ball-shaped element, said gasket element being generally L-shaped in cross section, a collar mounted on said housing and securing the horizontal portion of said L-shaped gasket element to said casing, said collar having an annular groove with the upper end of the vertical portion of the L-shaped gasket element extending therein with a wall of said groove being engaged by said vertical portion, said collar having a series of ports communicating the interior of said collar with said groove.

4. A sealing structure of the character described comprising a casing, an annular ring-shaped gasket element which is generally L-shaped in cross section, a collar, means mounting said collar on said casing with the horizontal portion of said L-shaped gasket being sandwiched between said collar and said casing, said collar having an annular grooved portion, the vertical portion of said L-shaped gasket extending into said grooved portion, a ball-shaped element in said casing, said gasket having an annular land contacting said ball-shaped element, a contact ring between said gasket and said collar and on the opposite side of said gasket than is said land, means biasing said contact ring into engagement with said gasket to thereby press said land into engagement with said ball-shaped element, and said collar having at least one port communicating the interior of said collar with said groove therein.

5. An arrangement as set forth in claim 4 in which said contact ring has an annular shouldered portion, and shims on said shouldered portion for adjustment of the space between said contact ring and said collar.

6. An arrangement as set forth in claim 4 including a second contact ring mounted on a shouldered portion of said casing and contacting the horizontal portion of said L-shaped gasket.

7. In an arrangement of the character described, a casing, a generally ball-shaped element mounted in said casing, an annular ring-shaped gasket which is generally L-shaped in cross section and which has an annular land contacting said ball-shaped element, a collar-like element mounted on said casing and securing the horizontal portion of said L-shaped gasket to said casing, the upper portion of the vertical of said L-shaped gasket contacting said collar member whereby an intermediate portion of said gasket element serves as a diaphragm, and means acting between said collar and said gasket serving to press said land into engagement with said ball-shaped element.

8. An arrangement as set forth in claim 7 in which the last-mentioned means comprises spring means acting between said collar and said diaphragm portion of said gasket.

9. An arrangement as set forth in claim 7 in which the last-mentioned means includes ports extending through said collar and in communication with said diaphragm whereby pressure in said collar is communicated to said diaphragm portion to press the same into engagement with said ball-shaped element.

10. An arrangement as set forth in claim 1 including means mounted on said casing for rotating said spherically shaped valve element about an axis thereof.

References Cited by the Examiner

UNITED STATES PATENTS

| 1,901,961 | 3/33 | Grant | 251—159 |
| 2,732,170 | 1/56 | Shand | 251—172 |
| 2,892,609 | 6/59 | Bibbo | 251—306 XR |
| 2,921,768 | 1/60 | Blackburn | 251—174 XR |
| 2,988,320 | 6/61 | Kent | 251—174 |

FOREIGN PATENTS 843,149   8/60   Great Britain.

ISADOR WEIL, *Primary Examiner.*

CLARENCE R. GORDON, *Examiner.*